United States Patent Office 3,350,382
Patented Oct. 31, 1967

3,350,382
ARYLSULPHONYLTRIAZENE COMPOUNDS
Brian Ronald David Whitear and Douglas James Fry, Ilford, England, assignors to Ilford Limited, Ilford, England, a British company
No Drawing. Filed Jan. 11, 1965, Ser. No. 424,813
Claims priority, application Great Britain, Jan. 24, 1964, 3,243/64
6 Claims. (Cl. 260—140)

ABSTRACT OF THE DISCLOSURE

There are provided heat sensitive triazene compounds which are useful in thermography. The general formulae of the compounds is:

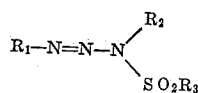

where $R_1$ and $R_3$ are aryl and substituted aryl and $R_2$ is methyl and ethyl. Examples of these compounds include 1,4',4''-tolylthio-2',5'-dimethoxy-3-methyl-3,4'-toluene-sulphonyl triazene and 1,4',4''-tolylthio-2',5'-dimethoxy-phonyl-3-methyl-3,2'-naphthalenesulphonyl-triazene.

---

This invention relates to heat-sensitive materials for image reproduction, the art known as thermography.

The principle of the thermographic process as currently practised is to provide a sheet material which is sensitive to heat in that it will change colour or blacken on being heated. The sheet is placed in contact with an "original," being a sheet carrying an image in a substance which absorbs infra-red radiation to become heated, and the sheets, in close contact are subjected to such radiation. The heat which is thus developed in the image is transferred to the immediately adjacent area of the heat-sensitive sheet causing it to change colour or darken, so that a reproduction of the image on the original is produced on the heat-sensitive sheet.

A wide variety of heat-sensitive materials have been proposed for use in this process. The process has been commercialised, and machines for applying the necessary infra-red radiation are widely available and in use.

It is an object of the present invention to provide new heat-sensitive triazene compounds which can be used in thermography.

According to a first feature of the present invention there are provided triazene dye bases of the general formula I:

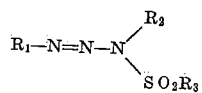

where $R_1$ and $R_3$ are aryl or substituted aryl groups and $R_2$ is methyl or ethyl.

In Formula I above the groups $R_1$ and $R_3$ which may be the same or different, may be for example, phenyl or naphthyl or other isocyclic hyrdocarbon groups or may be any said hydrocarbon groups containing conventional substituent groups, as for instance hydrogen, nitro, amino, N-substituted amino, sulphonic, alkyl, alkoxy, hydroxy-alkyl, alkylthio, aralkylthio, arylthio or aryloxy.

In a preferred embodiment of the invention $R_1$ is an aryl group substituted in the ortho position.

Triazene dye bases of Formula I above are prepared by reacting a diazonium salt of the general formula $R_1$—N=N—X, where $R_1$ has the meaning assigned to it above and X is an anion, with a sulphonamine of the general Formula II:

where $R_2$ and $R_3$ have the meanings assigned to them above, in aqueous alkaline solution.

According to a further feature of the invention there is provided a heat-sensitive copying material which comprises a thin flexible carrier sheet having coated thereon, or impregnated therein, a mixture of a triazene dye base of Formula I above, an azo-coupling compound which will couple therewith to form a dye, and a solid melting between 60 and 150° C. which, when molten, is a solvent for the said triazene dye base and the said azo-coupling compound, the said mixture being dispersed in a translucent polymeric binder.

The azo-coupling compound employed may be phenol but is preferably resorcinol, phloroglucinol, naphthol, 3-hydroxy-2-naphthanilide or a β-ketonic ester anilide.

Whilst any solid melting between 60 and 150° C. which, when molten, is a solvent for the triazene and phenolic compound, may be employed, it is found generally preferable to employ an amide or a keto alcohol having such properties or a mixture of amides or alcohols or of an amide and an alcohol. Suitable such compounds are, for example, benzoin, furoin, benzamide, and acyl derivatives of aromatic amines such as acetanilide, propionanilide, acet-o-toluidide and acet-4-n-butylanilide.

It has been found that it is preferable to employ a mixture of fusible amides or keto alcohols, the mixture being so selected that it melts over a range of temperature, i.e. is not a eutectic mixture. It has been found that by this method better copies are obtained especially in cases where the original which is being copied contains both large and small areas of print. It is believed that the improvement is obtained because the larger areas heat up quicker so that if the compound employed melts sharply the fused material in those larger areas tends to migrate during the period that the areas corresponding to the smaller print are heating up to the fusion temperature, with consequent blurring of the image.

Other suitable solid materials are low melting point solid acids such as benzoic acid and salicylic acid.

The polymeric binder for use in the invention is preferably initially water soluble or soluble in aqueous alcohol as a method of coating the mixture of triazene dye base, azo-coupling compound and fusible amide and/or alcohol is to disperse this mixture in an aqueous or aqueous/alcohol solution of the binder and then to coat this dispersion on to the flexible carrier and then to dry this coating.

A suitable water-soluble polymeric binder is polyvinyl alcohol having some hydroxy groups esterified, such a product being obtained by the partial hydrolysis of polyvinyl acetate. The preferred polyvinyl alcohol contains 15 to 50% residual acetate groups.

It is preferred that the binder should be water-insoluble after the aqueous or aqueous alcohol dispersion of the mixture of triazene dye base, azo-coupling compound and fusible amide and/or alcohol and binder which has been coated on to the flexible carrier has been dried. A suitable binder of this type is polyvinyl alcohol of the above type which has been cross-linked by glyoxal. The glyoxal is added to the dispersion described above just before coating and cross-linking of the polyvinyl alcohol occurs during the drying process subsequent to the coating. Greater cross-linking of the polyvinyl alcohol occurs if the drying is carried out using slight heat, i.e. not exceeding 60° C., and preferably not exceeding 45° C.

Other suitable binders for use in the invention are polymers which contain sufficient acid groups to render them soluble in aqueous ammonia, but which are left as the water-insoluble free acids after drying, the ammonia being given off during the drying process.

The preferred acid polymer of this type for use in the invention is a copolymer of methyl methacrylate-methacrylic acid having an acid number between 100 and 250.

When a said mixture of triazene, azo-coupling compound and fusible amide and/or alcohol is dispersed, preferably in an aqueous, aqueous alcohol or aqueous ammonia solution of the binder as aforesaid, no premature colour formation occurs. After this dispersion has been coated, for example on a thin translucent paper sheet, and dried, it may be exposed to an original in the manner usual for thermographic materials, to infra-red radiation, in order to afford a reproduction of the original which is of high definition and high density against a substantially uncoloured background.

It will be appreciated that to obtain the best contrast in the image the coated complex should be selected to impart as little colour as possible to the paper base. The inclusion of a white pigment, e.g. titanium dioxide, in the coating composition is found to be of assistance.

When the products of this invention are acid-sensitive, a thin protective infra-red transmissive supercoat, e.g. of a synthetic resin, may be applied over the heat-sensitive layer. If the support for the heat-sensitive layer is translucent or transparent this supercoat layer may be pigmented, e.g. with a white pigment.

It has been found that the intensity of the dye images obtained by thermographic exposure of the products of this invention may be increased by subjecting the products, after thermographic exposure, to ultraviolet radiation e.g. by a brief exposure to the light from a high pressure mercury vapour lamp or by a longer exposure to daylight. The invention accordingly includes the process of subjecting the products of this invention successively to thermographic exposure and ultraviolet radiation.

It has been found that the heat-sensitive materials of the present invention present important advantages over prior materials of analogous construction. Thus, as compared with analogously constructed materials made with triazene derivatives as previously prepared for the purpose, dye image of higher density are obtained on exposure under similar conditions. Alternatively adequate images may be obtained using shorter exposures than hitherto, the resulting less dense images being afterwards intensified by exposure to ultra-violet radiation.

As the triazene dye basis of this invention do have a low light sensitivity it is possible to decompose the uncoupled triazenes after a thermographic exposure by exposure of the material for some hours to daylight and thus stabilise the thermographic image.

The following examples will serve to illustrate the invention.

EXAMPLE 1

*1,4',4''-tolylthio-2',5'-dimethoxyphenyl-3-methyl-3,4'-toluenesulphonyltriazene*

N-methyl-4-toluenesulphonamide (1.7 g.) was dissolved in a mixture of 10% sodium hydroxide solution (4.5 ml.) and water (50 ml.); the solution was filtered and mechanically stirred with crushed ice (50 g.). To this a solution of 2,5-dimethoxy-4,4'-tolylthiobenzenediazonium chloride prepared from the zincichloride double salt (4 g.) dissolved in water (100 ml.) and treated with 10% sodium hydroxide soln. (4 ml.) to precipitate the zinc as hydroxide, which was removed by filtration, was added rapidly. Stirring was continued for 30 minutes then the product was filtered off, washed with water and dried in vacuo. Yield 3.5 g.

The triazene crystallised as pale yellow prisms from carbon tetrachloride, M.P. 131° C.

Found, C, 58.6; H, 5.4; S, 13.45; $C_{23}H_{25}N_3O_4S_2$ requires C, 58.6; H, 5.35; N, 8.9; S, 13.6%.

A smooth dispersion was prepared by ball-milling the above triazene (2 g.) with a mixture of 3-hydroxy-2-naphthanilide (2 g.), acetanilide (20 g.) titanium dioxide (15 g.) and 10% aqueous or aqueous alcohol "Gelvatol" (150 ml.). This was coated as a thin layer on paper and on thermographic exposure to a graphic original it gave a blue image on a faint yellow background.

EXAMPLE 2

*1,4',4''-tolylthio-2',5'-dimethoxyphenyl-3-ethyl-3,4'-toluenesulphonyltriazene*

A solution of 2,5-dimethoxy-4,4'-tolylthiobenzenediazonium chloride was prepared from the zincichloride double salt (4 g.) dissolved in cold water (100 ml.), treated with 10% sodium hydroxide solution (4 ml.) and the insoluble zinc hydroxide removed by filtration. The diazonium salt solution was slowly added at 5° C. to a solution of N-ethyl-4-toluenesulphonamide (1.8 g.) in 1% sodium hydroxide solution (50 ml.) cooled to 5° C. The product separated and was collected, then dried in vacuo. Yield 3.0 g. It was recrystallised from ether which yielded the product as pale yellow prisms, M.P. 108° C.

A fine dispersion was prepared by ball-milling the triazene (2 g.) with a mixture of phloroglucinol (2 g.), acetanilide (20 g.) titanium dioxide (15 g.) and 10% aqueous "Gelvatol" (150 ml.). This was coated as a thin layer on paper and on thermographic exposure to a graphic original it gave a black image on a cream background.

EXAMPLE 3

*1,4'',2',5'-trimethoxy-4'diphenylyl-3-methyl-3,4'-toluenesulphonyltriazene*

4',2,5-trimethoxy-4-diphenylyldiazonium chloride (2.5 g.) was dissolved in ice water (150 ml.) and added fairly rapidly to a solution of N-methyl-4-toluenesulphonamide (1.7 g.) in ice cold 1% sodium hydroxide solution (50 ml.). The product slowly separated. The mixture was stirred at 50° C. for 1 hour and the product collected, washed and dried. It separated as micro crystals from ether, M.P. 108° C. Found, C, 60.7; H, 5.5; S, 7.2; $C_{23}H_{25}N_3O_3S$ requires C, 60.65; H, 5.5; S, 7.05%.

A mixture of triazene (1 g.) 3-hydroxy-2-naphthanilide (1 g.) acetanilide (10 g.) titanium dioxide (8 g.) and 10% aqueous "Gelvatol" (75 ml.) were ball-milled together for 4 hours then coated as a thin layer on paper. On thermographic exposure a blue image was obtained.

EXAMPLE 4

*1,4',4''-tolylthio-2',5'-diethoxyphenyl-3-methyl-3,4'-toluensulphonyltriazene*

N-methyl-4-toluenesulphonamide (3.6 g.) was dissolved in a mixture of water (50 ml.) and 10% sodium hydroxide (9 ml.) and the filtered solution slowly added with mechanical stirring at 5° C. to a solution of the diazonium salt prepared thus.

2,5-diethoxy-4,4'-tolylthiobenzene diazonium hydrogen sulphate (7.5 g.) was dissolved in ice water (150 ml.) and treated with sodium hydrogen carbonate (1.8 g.) and the clear solution filtered. The product soon separated and the pale yellow solid was collected and dried. It separated as lemon prisms from ether, M.P. 108–9° C. Found, C, 60.1; H, 5.7; S, 13.1; $C_{25}H_{27}N_3S_2O_4$ requires C, 60.35; H, 5.47; S, 12.9%.

A mixture of the triazene (1 g.), acetanilide (10 g.), titanium dioxide (8 g.), 3-hydroxy-2-naphthanilide (1 g.), 10% aqueous "Gelvatol" (75 ml.) were ball-milled to yield a smooth dispersion and then coated on paper. On thermographic exposure to a graphic original it gave a blue image.

EXAMPLE 5

A material for thermographic reproduction was prepared as described in Example 1, except that the smooth dispersion obtained by ball-milling was obtained by replacing the acetanilide (20 g.) by benzoin (20 g.). The thermographic image was substantially the same.

EXAMPLE 6

A material for thermographic reproduction was prepared as described in Example 1, except that the acetanilide (20 g.) was replaced by benzil (20 g.) for the ball-milling operation. The image obtained was virtually the same.

EXAMPLE 7

A material for thermographic reproduction was prepared as described in Example 2, except that the coating was obtained by substituting propionanilide (20 g.) for the acetanilide (20 g.) there described. The thermographic result was essentially the same.

EXAMPLE 8

A material for thermographic reproduction was prepared as described in Example 3, except that the dispersion obtained by the ball-milling operation was obtained in this case by replacing the acetanilide (10 g.) by acet-N-methyl-anilide (10 g.). Thermographic exposure of the coated material gave a blue image on a cream background.

EXAMPLE 9

*1,4',4''-tolylthio-2',5'-dimethoxyphenyl-3-methyl-3-benzenesulphonyltriazene*

2,5-dimethoxy-4,4'-tolylthiobenzenediazonium zincichloride double salt (10 g.) was dissolved in water (200 ml.) and treated with 10% sodium hydroxide in water (10 ml.) with stirring. The precipitated zinc hydroxide was removed by filtration and the filtrate reacted with a solution of N-methylbenzenesulphonamide (3.4 g.) in water (50 ml.) containing 10% aqueous sodium hydroxide (9 ml.). The product was collected, washed with water and dried. The triazene separated as pale-lemon prisms when recrystallised from ether, M.Pt. 122° C. (Found: C, 57.4; H, 4.8; N, 9.2. $C_{22}H_{23}N_3O_4S_2$ requires C, 57.75; H, 5.1; N, 9.2%). Yield 7.5 g.

A smooth dispersion was prepared by ball-milling the following components: acetanilide (7 g.), 3-hydroxy-2-naphthanilide (0.3 g.), the sulphonyl triazene described above (0.5 g.) titanium dioxide (2.5 g.), glycerol (0.6 ml.) and 6% hardened "Gelvatol" solution (30 ml.). The latter renders the subsequent coating formed on paper insoluble in water and is obtained by warming "Gelvatol" 40/20 grade (1.8 g.) and 100% glyoxal (1.1 g.) in water (27 ml.).

The thin layer coated on paper, when dried and exposed to a graphic original gave a blue image on a cream background.

EXAMPLE 10

*1,4',4''-tolylthio-2',5'-dimethoxyphenyl-3-methyl-3,2'-naphthalenetriazene*

The zinc free diazonium salt was prepared as described in Example 9 from the double salt (10 g.) and treated with stirring with a solution of naphthalene-2-sulphon-N-methylamide (4.4 g.) in a mixture of 10% aqueous sodium hydroxide (12 ml.), water (100 ml.) and 1,4-dioxan (20 ml.). The product separated and was collected. It was dried in vacuo, then recrystallised from chloroform-ether which yielded the product as buff-yellow crystals, M.P. 132° C. (Found: C, 60.4; H, 5.1; S, 12.65;

$$C_{26}H_{25}N_3O_4S_2$$

requires C, 61.5; H, 5.0; S, 12.65%.)

A fine dispersion of the triazene (0.5 g.), acetanilide (6 g.), propionanilide (1 g.), 3-hydroxy-2-naphthanilide (0.3 g.), titanium dioxide (2.5 g.) and 6% hardened "Gelvatol" solution (30 ml.) was obtained by ball milling, then coated as a thin layer on tracing paper. On thermographic exposure a blue image was obtained on a cream background.

EXAMPLE 11

*1,4',4''-tolylthio-2',5'-dimethoxyphenyl-3-ethyl-3,2'-naphthalene sulphonyltriazene*

The compound was prepared by the method described in Example 10; but using naphthalene-2-sulphon-N-ethylamide (4.4 g.) in place of the N-methylamide. The triazene crystallised as small buff crystals from ethylacetate-ether. It had M.P. 109° C. (Found: C, 62.6; H, 5.4; N, 8.1. $C_{27}H_{27}N_3O_4S_2$ requires C, 62.2; H, 5.2; N, 8.05%.)

The triazene (1.0 g.) acetanilide (7 g.), titanium dioxide (2.5 g.) and 6% hardened "Gelvatol" (30 ml.) as one portion, and 3-hydroxy-2-naphthanilide (0.6 g.) titanium dioxide (2.5 g.), 6% hardened "Gelvatol" (30 ml.) glycerol (1.0 ml.) and acetanilide (7 g.) as the second portion were separately ball milled to a smooth dispersion, then mixed prior to coating on paper. The resultant coating when dried and exposed to a thermographic master gave a blue image on an off-white background.

EXAMPLE 12

*1,4',4''-tolylthio-2',5'-dimethoxyphenyl-3-methyl-3,4'-chlorobenzenesulphonyltriazene*

The triazene was prepared from the diazo zinc double salt (10 g.) from which the zinc had been removed as described in Example 9. The aqueous solution was treated with N-methyl-4-chloro benzene sulphonamide (4.2 g.) dissolved in 0.5% sodium hydroxide in water (160 ml.) which was added slowly with stirring. The precipitated product was filtered off and dried in vacuo. It separated as yellow crystals when recrystallised from chloroform-ether, M.P. 134° C. (Found: C, 53.6; H, 4.7; S, 13.7; OCH₃; 12.5. $C_{22}H_{22}N_3O_4ClS_2$ requires C, 53.7; H, 4.5; S, 13.05; OCH₃, 12.6%.)

The triazene (1.0 g.), acetanilide (6.25 g.), propionanilide (0.75 g.), titanium dioxide (2.5 g.), 6% hardened "Gelvatol" (30 ml.) as one portion and 3-hydroxy-2-naphthanilide (0.6 g.), titanium dioxide (2.5 g.), acetanilide (6.25 g.), propionanilide (0.75 g.), 6% hardened "Gelvatol" (30 ml.) and glycerol (1.0 ml.) as the second portion were separately ball milled to produce a fine dispersion. These were mixed together prior to coating on paper as a thin layer. On exposure to a thermographic "original" a blue image was formed on an off-white background.

EXAMPLE 13

*1,4',4''-tolylthio-2',5'-dimethoxyphenyl-3-methyl-3,4'-bromobenzenesulphonyl triazene*

The bromotriazene was prepared in the same way as described for the corresponding chloro derivative. It separated as yellow plates from chloroform-ether and had M.P. 133° C. (Found: C, 49.4; H, 4.0; N, 7.7; S, 12.0. $C_{22}H_{22}N_3O_4BrS_2$ requires C, 49.25; H, 4.15; N, 7.85; S, 11.95%.)

When the triazene (1.0 g.) was ball-milled and coated with the other components as described in Example 12, the coating yielded a blue image on thermographic exposure.

EXAMPLE 14

*1,4',4''-tolylthio-2',5'-dimethoxyphenyl-3-methyl-3,4'-nitrobenzene triazene*

2,5-dimethoxy-4,4'-tolythiobenzene diazonium zincichloride double salt (10 g.) was dissolved in water (100 ml.) and the zinc precipitated as hydroxide by the addition of 10% aqueous sodium hydroxide (10 ml.). It was removed by filtration and the filtrate treated with a solution of 4-nitrobenzene-N-methyl sulphonamide (4.3 g.) in 1% sodium hydroxide solution (80 ml.) with stirring. The product separated and was collected, then dried in vacuo. When recrystallised from chloroform-ether it was obtained as orange-red crystals, M.P. 115° C. (Found: C, 52.8; H, 4.6; N, 11.2; OCH₃, 12.7. $C_{22}H_{22}N_4O_6S_2$ requires C, 52.6; H, 4.4; N, 11.15; OCH₃, 12.35%.)

The triazene (1 g.) was ball-milled and with the other components as described in Example 12, then the two dispersions were mixed together and coated as a thin layer on paper. On thermographic development a blue image on an off-white background was obtained.

EXAMPLE 15

*1,4′,4″-tolylthio-2′,5′-dimethoxyphenyl - 3-methyl-3,4′-toluenesulphonyl triazene* (1 g.), prepared as described in Example 1, acetanilide (7 g.), titanium dioxide (2.5 g.), 40/20 "Gelvatol" (2.0 g.), water (30 ml.) and glycerin (0.5 ml.) were ball-milled together. Acetanilide (7.0 g.) 3-hydroxy-2-naphthanilide (0.6 g.) titanium dioxide (2.5 g.) a methyl methacrylate-methacrylic acid copolymer of acid value 140 (2.0 g.) ammonium hydroxide 2.0 ml. of D. 0.920) and glycerin (0.5 ml.) were similarly ball-milled together until a smooth dispersion obtained. The two portions were mixed together, then coated on paper and dried. The water-insoluble coating on thermographic exposure yielded a blue image on a cream background.

EXAMPLE 16

A material for thermographic reproduction was prepared as described in Example 15, except that the mixture was obtained by replacing the acetanilide (7 g.) in each dispersion by a mixture of acetanilide (6.25 g.) and acet-p-toluidide (0.75 g.). A substantially similar result was obtained on thermographic development.

EXAMPLE 17

*1,2-ethylene-3,3′-bis-(1,4′,4″-tolylthio-2′,5′-dimethoxyphenyl-3,4′-toluenesulphonyltriazene)*

The zinc free 2,5-dimethoxy-4,4′-tolylthio benzene diazonium chloride was prepared from the double salt (10 g.) as described in Example 9 and treated with stirring at 10° C. with a solution of N,N′-1,2-ethylene bis-4-toluenesulphonamide (3.5 g.) in dioxan (50 ml.) and 10% sodium hydroxide (9.0 ml.). The product separated and was collected, then washed with water and dried. When recrystallised from chloroform-ether it separated as yellow prisms, M.P. 145° C. (Decomp.) (Found: C, 58.1; H, 5.1; S, 14.1. $C_{46}H_{28}N_6O_8S_4$ requires C, 58,6; H, 5.3; S, 13.6%.)

A smooth dispersion of the triazene (0.5 g.) with the other components described as in Example 9 was prepared by ball-milling. When coated and exposed thermographically it gave a substantially similar result.

EXAMPLE 18

*Naphthalene-1,5-disulphonyl-3,3′-bis-(1,4′,4″-tolylthio-2′,5′-dimethoxyphenyl-3-methyl triazene*

This compound was prepared in a manner essentially similar to Example 17. When it was recrystallised from chloroform-ether, it was obtained as yellow prisms, M.P. 134° C. (Decomp.) (Found: C, 56.0; H, 4.5; N, 10.2; S, 14.9. $C_{42}H_{42}N_6O_8S_4$ requires C, 56.8; H, 4.75; N, 9.5; S, 14.45%.)

When ball-milled to a smooth dispersion with the other components listed in Example 9, the triazene (0.5 g.) yielded a blue image on thermographic exposure of a thin coating.

EXAMPLE 19

*1,4″,2′,5′-trimethoxy-4′-diphenylyl-3-methyl-3,4′,2′-naphthalenesulphonyl triazene*

Yellow crystals from chloroform-ether, M.P. 130° C. (Found: C, 63.3; H, 5.2; S, 6.7. $C_{26}H_{25}N_3O_5S$ requires C, 63.5; H, 5.15; S, 6.5%.)

EXAMPLE 20

*1,4″,2′,5′-trimethoxy-4′-diphenylyl-3-methyl-3-benzenesulphonyltriazene*

Yellow prisms from chloroform-ether, M.P. 113° C. (Found: C, 59.7; H, 5.3; N, 9.9. $C_{22}H_{23}N_3O_5S$ requires C, 59.85; H, 5.25; N, 9.5%.)

EXAMPLE 21

*1,4″,2′,5′-trimethoxy-4′-diphenylyl-3-methyl-3-4′-bromobenzene-sulphonyl triazene*

Orange prisms from chloroform-ether, M.P. 131° C. (Found: N, 8.3; OCH₃, 17.9. $C_{22}H_{22}N_3O_5BrS$ requires N, 8.1; OCH₃, 17.9%.)

EXAMPLE 22

*1,4″,2′,5′-trimethoxy-4′-diphenylyl-3-methyl-3-4′-nitrobenzenesulphonyl triazene*

Orange crystals from chloroform-ether, M.P. 115° C. (Found: C, 55.6; H, 4.5; OCH₃, 19.5. $C_{22}H_{22}N_4O_7S$ requires C, 54.3; H, 4.55; OCH₃, 19.15%.)

The triazenes of Examples 19, 20, 21, 22 when ball-milled with 3-hydroxy-2-naphthanilide in the manner described in Example 15 all yielded blue images on thermographic exposure.

EXAMPLE 23

*1,4′-chlorophenyl-3-methyl-3-4′-toluenesulphonyl triazene*

When recrystallised from cyclohexane it separated as pale buff prisms, M.P. 109° C. (Found: C, 51.3; H, 4.1; S, 10.4. $C_{14}H_{14}N_3O_2SCl$ requires C, 51.9; H, 4.35; S, 9.9%.)

The triazene was ball-milled with 3-hydroxy-2-naphthanilide in the manner described in Example 15 and coated on thin paper. On thermographic development an orange image was formed on a white background.

EXAMPLE 24

*1,4′,4″-tolylthio-2′, N-ethoxycarbonyl, methylamino-5′-methoxyphenyl-3-methyl-3-4′-toluenesulphonyl triazene*

The triazene was prepared in the usual manner from the corresponding diazonium salt. It separated as pale cream microprisms from ether, M.P. 143° C. (Found: C, 57.8; H, 5.8; N, 10.0; S, 12.4. $C_{26}H_{30}N_4O_5S_2$ requires C, 57.55; H, 5.6; N, 10.3; S, 11.8%.)

Thermographic exposure of the triazene and 3-hydroxy-2-naphthanilide when coated on paper in the manner described in Example 15 gave a purple image on a white background. The image was intensified by exposure to ultra-violet light.

EXAMPLE 25

The triazene of Example 24 (1 g.) was ball-milled to a smooth dispersion with titanium dioxide (2.5 g.), acetanilide (7 g.), 40/20 "Gelvatol" (2.0 g.) in water (30 ml.). Acetanilide (7.0 g.) benzoylacetanilide (1.0 g.), titanium dioxide (2.5 g.) a methyl methacrylate-methacrylic acid copolymer of acid value 140 (2.0 g.) ammonium hydroxide (2.0 ml. of D.O. 920) were also ball-milled to a smooth dispersion, then mixed with the first portion and coated on paper. The dried coating was thermographically exposed and yielded a yellow image on a white background. The image could be intensified by exposure to daylight.

EXAMPLE 26

The triazene of Example 24 (2 g.) was ball-milled to a smooth dispersion with acetanilide (7 g.) 40/20 "Gelvatol" (2.0 g.) in water (30 ml.). Acetanilide (7 g.), 2-benzoylacetnaphthanilide (2 g.) methylmethacrylate-methacrylic acid copolymer (20 g.) and ammonium hydroxide (2 ml. of D.O. 920) were also ball-milled to a smooth dispersion and then mixed with the first portion. The mixture was coated on to clear film base and dried. On thermographic exposure and light intensification of the yellow image on a colourless translucent background there was obtained a product suitable for use as a dyeline master. From this, good quality dyeline prints were obtained.

EXAMPLE 27

*1,4′-phenoxy-2′,5′-dimethoxyphenyl-3-methyl-3-4′-toluenesulphonyl triazene*

This compound was prepared as described for the analogous triazene in Example 9. It was obtained as off-white needles from carbon tetrachloride, M.P. 114° C. (Found: C, 60.0; H, 5.5; N, 9.8. $C_{22}H_{23}N_3O_5S$ requires C, 59.85; H, 5.25; N, 9.5%.)

The triazene (1.0 g.) was ball-milled to a smooth dispersion with the other components listed in Example 25 and coated on paper in the manner described. On thermographic development a yellow image on a white background was obtained.

We claim as our invention:

1. 1,4′,4″-tolylthio-2′,5′-dimethoxyphenyl - 3 - methyl-3,4′-toluenesulphonyl-triazene.
2. 1,4″,2′,5′-trimethoxy-4′-diphenylyl - 3 - methyl-3,4′-toluenesulphonyl-triazene.
3. 1,4′,4″-tolylthio-2′,5′-dimethoxyphenyl - 3 - methyl-3-benzenesulphonyl-triazene.
4. 1,4′,4″-tolylthio-2′,5′-dimethoxyphenyl - 3 - methyl-3-2′-naphthalenesulphonyltriazene.
5. 1,4″,2′,5′-trimethoxy-4′-diphenylyl - 3 - methyl-3,4′,2′-naphthalenesulphonyltriazene.
6. 1,4′,4″-tolylthio-2′,N-ethoxycarbonyl, methylamino-5′-methoxyphenyl-3-methyl - 3 - 4′ - toluenesulphonyl triazene.

References Cited

UNITED STATES PATENTS 2,883,371    4/1959    Thomas et al.

FOREIGN PATENTS 760,632    11/1956    Great Britain.

OTHER REFERENCES

Dutt et al., J. Chem. Soc. (London), vol. 119, pp. 2088–2094 (1921).

Key et al., J. Chem. Soc. (London), vol. of 1928, pp. 2035–2040.

CHARLES B. PARKER, *Primary Examiner.*

F. D. HIGEL, *Examiner.*